Oct. 6, 1942.   R. E. RANEY   2,298,164
CONTROL SYSTEM
Filed March 9, 1939
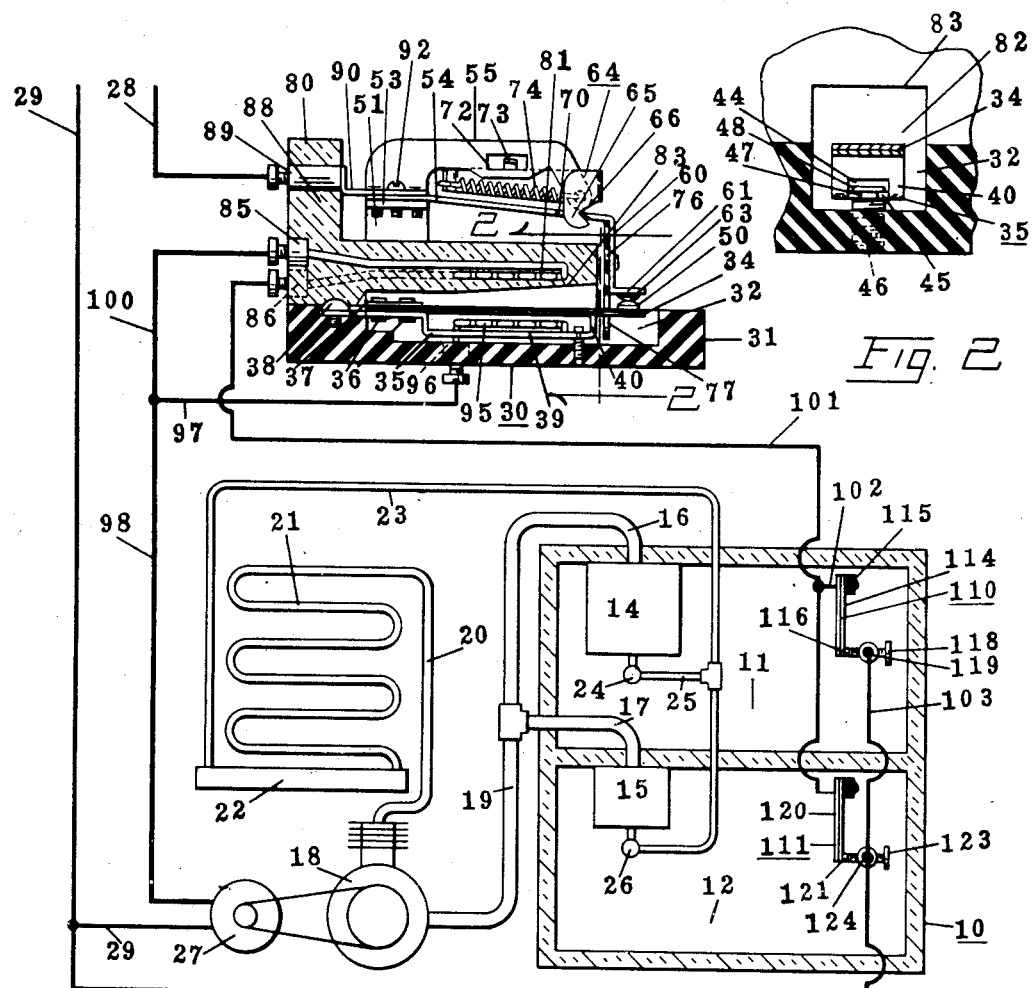
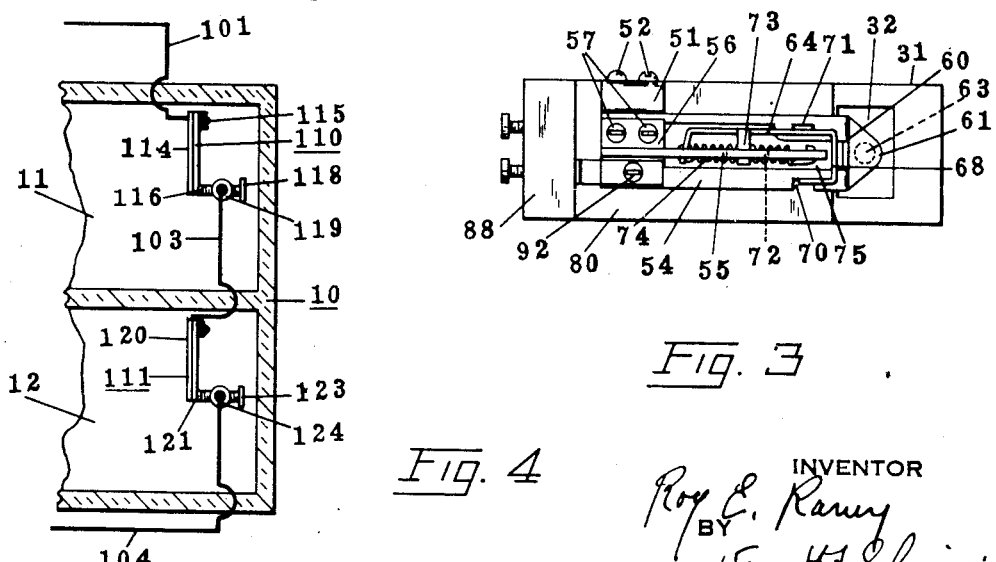
INVENTOR
Roy E. Raney
BY
Warren H. F. Schmidt
ATTORNEY Patented Oct. 6, 1942

2,298,164

UNITED STATES PATENT OFFICE 2,298,164

CONTROL SYSTEM

Roy E. Raney, Columbus, Ohio, assignor to Ranco Incorporated, Columbus, Ohio, a corporation of Ohio Application March 9, 1939, Serial No. 260,714

9 Claims. (Cl. 62—4)

This invention relates to a control method and control apparatus for heat exchange systems, and more particularly to a control method and control apparatus for refrigerating system.

An object of the present invention is to provide a method of controlling a heat exchange system which consists in causing alternately, warming and cooling phases in a heat exchanger and maintaining one of the phases for a predetermined timed period, and then maintaining the alternate phase for a period determined according to temperature in the system.

Another object of the invention is to provide a control apparatus for a heat exchange system, including a heat exchanger and means for circulating a heat exchange medium through the exchanger, which apparatus controls the circulating means for causing alternately, warming and cooling phases in the exchanger, one of the phases being terminated after a predetermined timed period after initiation thereof and the other phase being terminated in response to a certain desired temperature being produced in the system.

Still another object of the invention is to provide a control apparatus for a heat exchange system, including a heat exchanger and means for circulating a heat exchange medium through the exchanger, which apparatus controls the circulating means for causing alternately, warming and cooling phases in the exchanger, one of the phases being terminated after a predetermined timed period after initiation thereof and the other phase being terminated in response to a plurality or either of a plurality of desired temperatures being produced in the system.

A further object of the present invention is to provide a control apparatus for a heat exchange system, including a heat exchanger and means for intermittently circulating a heat exchanging medium through the exchanger to produce cooling and warming phases thereof, the control apparatus comprising a control member which is movable from one position to the other position after a predetermined timed period, and a device responsive to variations in temperature in the system for controlling movement of the control member to one of its positions.

A still further object of the present invention is to provide a control apparatus for a heat exchange system, including a heat exchanger and electrically operated means for circulating a heat exchange medium through the exchanger, which apparatus is adapted to control the circulating means to stop and start, at timed intervals, and which apparatus is affected in its control by an excessive flow of current through the circulating means and also affected in its control by a temperature responsive device subjected to a medium, the temperature of which medium is affected by the heat exchanger.

Other and further objects and advantages will be apparent from the following description, reference being had to the accompanying drawing wherein preferred forms of embodiments of the present invention are clearly shown.

In the drawing:

Fig. 1 is a diagrammatic illustration of a refrigerating system and a control switch therefor, the switch being partly in section;

Fig. 2 is a fragmentary view, on a larger scale, taken on line 2—2 of Fig. 1;

Fig. 3 is a top view of the switch, and

Fig. 4 is a diagrammatic showing of an alternate circuit for the switch actuator.

Referring to the drawing, a heat exchange system is shown including an insulated cabinet 10, having two separate compartments 11 and 12 for storing food stuffs and the like and a heat exchanger 14 disposed in compartment 11 and another heat exchanger 15 disposed in compartment 12. The heat exchangers 14 and 15 are constructed to permit circulation of a heat changing medium therethrough and in the present embodiment, refrigerant is circulated through the exchangers to absorb heat from compartments 11 and 12. The refrigerant is circulated through the exchangers by a compressor 18 that withdraws gaseous refrigerant from the exchangers through pipes 16, 17 and 19, compresses the same and directs the compressed refrigerant through a pipe 20 to a condenser 21. The condensed refrigerant collects in a receiver 22 and is then directed through a pipe 23, part thereof entering a pressure reducing valve 24, through a pipe 25, and part entering a pressure reducing valve 26. The valves 24 and 26 are connected to the bottoms of the exchangers 14 and 15 respectively. The refrigerant expands in the exchangers, absorbing heat to produce a cold phase of operation of the exchangers. The compressor is adapted to be driven by an electric motor 27 connected in a power circuit by wires 28 and 29.

The exchanger 14 has more surface area than the exchanger 15 for maintaining the compartment 11 at a considerably lower temperature than that of the compartment 12. Preferably the compartment 11 is maintained at 15 deg. F.

for storing frozen food stuffs and the compartment 12 is maintained at 42 deg. to preserve fresh, unfrozen food stuffs.

The circuit for the motor 27 is controlled by a control switch 30 connected in the power circuit. The switch mechanism is mounted on a base 31, preferably formed of a dielectric material such as Bakelite or hard rubber, that may be suitably mounted adjacent the motor 27 or at any other convenient location. The base 31 has a rectangular recess 32 formed therein in which an electrically timed switch actuating device is disposed. The switch actuating device comprises a bimetallic strip 34 secured at one end to a brass strip 35 by rivets 36, the brass strip 35 being secured at one end to the base 31 by a screw 38. The bimetal and brass strips extend lengthwise of the recess 32. A reenforcing plate 37 may be interposed between the heads of the rivets 36 and the bimetal strip to secure the bimetal firmly in position. The strip 35 is formed with an offset section 39 and the end thereof is turned upward as at 40 to form a stop for the bimetal strip. A slot is formed adjacent the end of the strip 35 having a relatively wide opening 44 in the portion 40 and a narrower opening 45 in the offset portion 39. A screw 46, formed with a neck 47 and head 48 is threaded in the base 31, and when the device is assembled, the head 48 is inserted in the opening 44 and the neck in the opening 45. The strip 35 is thus held between the head 48 and the shoulders adjacent the neck 47. The position of the strip 35 and consequently the bimetal strip 34 may be adjusted with reference to the bottom wall of the recess 31 by adjusting the screw 46 in the base 31. A contact member 50 is suitably secured to the free end of the bimetal strip 34 and forms one contact of the control switch.

The bimetal 34 is adapted to operate a toggle switch mechanism supported by a bracket 51 attached to the side of the base 31 by screws 52. The bracket 51 has a laterally extending shoulder 53 on which a flexible contact strip 54 and a fixed rigid arm 55 are mounted. One end of the contact strip 54 is secured between the shoulder 53 and a flange 56, formed at right angles to the arm 55, by screws 57. A leg 60 is formed on the free end of the contact strip 54 and a foot 61 is formed at right angles to the leg. A contact member 63 is riveted on the foot 61 and is adapted to engage the contact 50 when the switch is closed. The contact strip 54 is adapted to be moved to the switch opening and closing positions with a snap action by a spring actuating flipper lever 64 pivoted thereon. The flipper 64 is formed with two spaced downwardly extending lugs 65 (only one appearing in the drawing) each having a V shaped notch 66 formed therein. One of the lugs 65 is spaced from the flipper lever by a yoke 68. An inset 70 is formed in one edge of the contact strip 54 and the latter mentioned lug 65 is disposed in the inset with the V notch engaging one edge thereof to form a pivot for the flipper. A rectangular opening 71 is formed in the strip 54 opposite the inset 70 and the other of the notched lugs 65 is disposed therein with an edge of the opening engaging in the V notch to form a second pivot for the flipper. Preferably the engaging edges of the inset and opening are beveled to minimize friction. A tension spring 74 interconnects the free end of the flipper 64 and the end of the arm 55 to bias the flipper toward its pivots. A laterally extending lug 73 is formed on the flipper 64 and extends into a rectangular slot 72 formed in the arm 55 to limit downward movement of the flipper 64 by the spring 74. The contact strip 54 has a substantially rectangular central opening 75 through which the end of the flipper lever 64 may extend when the end of the flipper is lowered. It is apparent that when the pivots of the flipper are moved above the center of the spring 74 the spring will bias the end of the flipper downwardly and the end of the contact strip upwardly. When the pivots are moved below the center of the spring 74 the end of the flipper will be biased upwardly and the end of the contact strip will be biased downwardly.

A fibre strip 76 is riveted to the leg 60 of the contact strip 54 and extends below the foot 61. The end of the strip is provided with an opening 77, through which the bimetal 34 extends. The bimetal strip 34 is flexed upwardly when heated and raises the contact strip 54 to move the pivots of the flipper 64 above the center of the spring 74. When this occurs the free end of the flipper 64 is snapped downwardly and moves the end of the contact strip 54 upwardly with a snap action to open the switch. The opening movement is limited by the lower edge of the opening 77 striking the bimetal strip 34. When the bimetal cools it moves the fibre strip 76 and the contact strip 54 downwardly until the pivots of the flipper are moved below the center of the spring 74, which will cause the spring to snap the flipper upwardly against the under side of the arm 55 and cause the contact strip to be snapped downwardly to close the contacts.

The bimetal 34 is adapted to be heated by a heater unit comprising a ceramic block 80 having a heater coil 81 embedded therein. Preferably the block is formed of material capable of holding heat for a relatively long period of time. The block 80 is suitably secured to the base 31 and is provided with a recess 82, the edges of which coincide with the edges of the recess 32. The top wall 83 of the recess is sloped upwardly to allow flexing of the bimetal strip. The heater coil 81 is formed of a suitable resistance wire shaped with a series of turned portions that form parallel transverse sections so that the block may be quickly heated. Two terminals 85 and 86 are embedded in the ceramic block and the ends of the heater coil 81 are suitably connected thereto. An upright section 88 is formed on the block and a terminal 89 is embedded therein. A copper strip 90 is connected at one end to the terminal 89, as by solder, and the other end thereof is connected to the contact strip 54 by a screw 92. The bimetal may also be heated by a heater element 95 disposed between the brass strip 35 and the bimetal strip 34. This heater element 95 is formed of a suitable resistance wire having a series of reverse turns that form parallel sections extending transversely with respect to the bimetal strip. One end of the heater element is suitably connected to the brass strip 35 and the other end is connected to a terminal 96 embedded in the base 31.

When the switching device 30 is closed the motor circuit is established as follows: Line wire 28, terminal 89, strip 90, contact strip 54, contacts 63 and 50, bimetal strip 34, brass strip 35, heater coil 95, terminal 96, wires 97 and 98, motor 27, and line wire 29. The heater coil 95 is connected in series with the motor 27 and is adapted to be heated by an excess amount of current flowing through the motor circuit.

The heater coil 81 is connected in parallel with the motor 27, and the heating of the coil is adapted to be controlled by temperature responsive devices 110 and 111 in the compartments 11 and 12 respectively. The device 110 comprises a bimetallic strip 114 anchored at 115 and carrying a contact 116 on the free end thereof. The contact 116 is adapted to engage the end of a contact screw 118 threaded in a post 119. The bimetal 114 closes the contacts, for example, when the temperature in the compartment 11 reaches 15 deg. F. and opens the same at temperatures above 15 deg. F. The closing temperature may be adjusted by adjusting the screw 118 in the post. The temperature responsive device 111 is similar to the device 110, comprising a bimetal strip 120 anchored at one end and carrying a contact 121 on the other end that is adapted to engage a contact screw 123 threaded in a post 124. The bimetal 120 closes the contacts 121 and 123, for example, when the temperature in the compartment 12 is reduced to 42 deg. F. and opens the contacts at temperatures above 42 deg. F. The closing temperature may be adjusted by the screw 123.

Referring to Fig. 1, one circuit for the coil 81 may be traced as follows: Line wire 28, control switch 30, wires 97 and 100, terminal 85, coil 81, terminal 86, wires 101 and 102, bimetal 114, contacts 116 and 118, wire 103, post 124, and wires 104 and 29. A circuit may be established around the temperature responsive device 110 and through wire 101, bimetal 120, contacts 121 and 123, post 124, and wires 104 and 29. This circuit will enable either one of the temperature responsive devices 110 and 111 to close the heater coil circuit.

If desirable, the temperature responsive devices 110 and 111 may be connected in series as illustrated in Fig. 4. In this instance, the wire 101 is connected directly to the bimetal 114 and the wire 103 is connected to the bimetal 120. Thus both devices 110 and 111 must be closed to close the heater circuit.

The operation of the device is as follows: When the bimetal strip 34 is at atmospheric temperature the switch 30 will be closed and the motor 27 will operate the compressor 18 to circulate refrigerant through the heat exchangers 14 and 15 to provide a cooling phase. If the temperature of the air in both compartments 11 and 12 is above 15 deg. F. and 42 deg. F. respectively, the temperatures desired to be maintained, the circuit of the heater coil 81 will not be energized. Also as long as the motor circuit is not overloaded, the heater coil 95 will remain at substantially atmospheric temperature. When the air in either one of the compartments 11 or 12 is cooled to the desired temperature as for example, when the air in compartment 11 reaches 15 deg. F., the bimetal 114 will close the contacts 116 and 118 and complete the circuit through the heater coil 81, when the circuit for the heater coil is connected as illustrated in Fig. 1. The energization of the heater 81 quickly raises the temperature of the block 80 and the heat radiated therefrom will cause the bimetal strip 34 to flex upwardly and open the control switch. Likewise if the bimetal strip 120 in the compartment 12 should be lowered to its switch closing temperature, namely 42 deg. F. prior to the closure of the bimetal 114, it may operate independently of the temperature responsive device 110 to energize the heater 81 and cause the switch to open. Thus either of the devices 110 or 111 may cause energization of the heater 81 when the heater circuit is connected according to the illustration in Fig. 1. However, should it be desirable to cause the refrigeration system to operate until both compartments 11 and 12 are reduced to the desired temperatures thereof, the devices 110 and 111 may be connected in series as illustrated in Fig. 4. In this instance both devices must be satisfied in order to energize the heater 81. When the bimetal 34 is heated by the heat from the block 30, it will move into contact with the recess wall 83 of the block and will be retained in that position for a timed period, i. e., until the temperature of the block is reduced to substantially ambient temperature. During this period the warming phase takes place in the heat exchangers since there is no circulation of refrigerant therethrough. When this occurs the bimetal will move to its lower position and reclose the control switch and bring about another cooling phase in the heat exchangers. If the temperature responsive devices 110 and 111 have not changed in temperature during the "off" period or warming phase of the refrigerating cycle, the heater 81 will be immediately reenergized and cause reopening of the switch 30 within a short period of time, otherwise the cooling phase will continue until the heater coil circuit is closed by either one or both devices 110 and 111.

Thus the warming phase of the refrigerating cycle will be terminated after a predetermined time after the initiation thereof and the cooling phase of the refrigerating cycle will be terminated after a short period of operation when the temperatures in the compartments are proper and if the temperatures in the compartments are above that desired, the cooling phase will be terminated only when one or both compartments, as the case may be, are cooled to the desired temperatures thereof. In this manner substantially constant temperatures can be maintained in either or both compartments.

In the event that an overload should occur in the motor circuit the heater element 95 being in series with the motor, will heat and cause the bimetallic strip to open the motor circuit and when the bimetal cools the switch will again close. This operation may continue until the overload is removed from the circuit.

While the forms of embodiments of the present invention as herein disclosed constitute preferred forms, it is to be understood that other forms might be adopted, all coming within the scope of the claims which follow.

I claim:

1. In a heat exchange system, a heat exchanger; a temperature responsive control device affected by temperatures of the exchanger; electrically operated means for circulating a heat exchange medium through the exchanger; a switch for controlling operation of the electrically operated means; and electrically energized means controlling the switch to start and stop operation of the circulating means for producing warming and cooling phases in the heat exchanger, said electrically energized means being energized to open said switch in response to a predetermined flow of current through said circulating means and said electrically energized means also being energized to open said switch in response to a certain temperature of said control device.

2. In a refrigerating system, a heat exchanger; electrically operated means for circulating refrigerant through the exchanger; a switch for controlling operation of the circulating means; a temperature responsive element for operating the switch; an electric heater for heating the element, said heater being connected in the circuit of the circulating means and responsive to a predetermined current flow in the electrically operated means to heat the element; a second heater for heating the element; a circuit for energizing the second heater; and thermostatic means responsive to temperatures produced by the heat exchanger for controlling energization of the second heater.

3. The method of controlling refrigeration which consists in intermittently producing cooling phases in a heat absorber, maintaining each of said phases until a certain refrigerating temperature is produced and maintaining the intervals between each of said phases substantially constant independent of the refrigerating temperatures.

4. The method of controlling the temperature of a medium which consists in subjecting the medium to a heat exchanger and varying the temperature of the exchanger to produce warming phases and cooling phases thereof, maintaining the duration of the cooling phases substantially constant and the duration of the warming phases substantially constant when the temperature of the medium is at a predetermined temperature, and increasing the duration of the cooling phases only in response to increases in the temperature of the medium above said predetermined temperature.

5. The method of controlling the temperature of a medium which consists in subjecting the medium to a heat absorber, intermittently producing cooling phases in the heat absorber, maintaining the cooling phases for substantially constant periods while the temperature of the medium is below a predetermined desired temperature and extending one of said phases, when the temperature is above said predetermined temperature, until the temperature of the medium is reduced to said predetermined temperature regardless of the temperature of the absorber, and maintaining the intervals between said cooling phases substantially constant.

6. In a heat exchange system, a heat exchanger; means for circulating a heat exchange medium through the exchanger; a controller for said means including a timing device for causing temperature cycles comprising warming and cooling phases to be produced in the exchanger, said device being operable for maintaining the duration of one of said phases of the cycles substantially constant and the duration of the other of said phases of the cycles substantially constant; and means for modifying the operation of the timing device for increasing the duration of a cooling phase only of said cycles in response to an increase in the temperature produced by the heat exchanger above a predetermined temperature.

7. In a refrigerating system, a heat exchanger; electrically operated means for circulating refrigerant through the exchanger; temperature responsive means for starting and stopping the first mentioned means in response to a variation in temperature; an electric heater for heating the second mentioned means for actuating the temperature responsive means; a circuit for energizing the heater, said circuit being controlled by the temperature responsive means; and means responsive to temperatures produced by operation of the heat exchanger for controlling said circuit in cooperation with said temperature responsive means.

8. In a refrigerating system, a heat absorber; electrically operated means for circulating refrigerant through the absorber; electrically energized means for controlling the first mentioned means, the second mentioned means being operable in response to energization thereof for stopping operation of the first mentioned means and operable for starting operation of the first mentioned means after a delay after deenergization thereof; and means responsive to temperatures produced by operation of the absorber for controlling energization of the second mentioned means.

9. In a heat exchange system, a heat exchanger; means for circulating a heat exchange medium through the exchanger; a controller for said means including a timing device for causing temperature cycles comprising warming and cooling phases to be produced in the exchanger, said device being operable for maintaining the duration of one of said phases of the cycles substantially constant and the duration of the other of said phases of the cycles substantially constant; and means for modifying the operation of the timing device for increasing the duration of a cooling phase only of said cycles in response to an increase in the temperature produced by the heat exchanger above a predetermined temperature and for restoring operation of said timing device in response to the production of said predetermined temperature by said heat exchanger.

ROY E. RANEY.